3,692,497
CATALYTIC EXHAUST GAS TREATMENT
APPARATUS
Carl D. Keith, Summit, John J. Mooney, Wyckoff, and
Louis J. Vanmansart, Upper Saddle River, N.J., assignors to Engelhard Minerals & Chemicals Corporation, Newark, N.J.
Filed May 20, 1971, Ser. No. 145,266
Int. Cl. F01n 3/14; B01j 9/04
U.S. Cl. 23—288 R                11 Claims

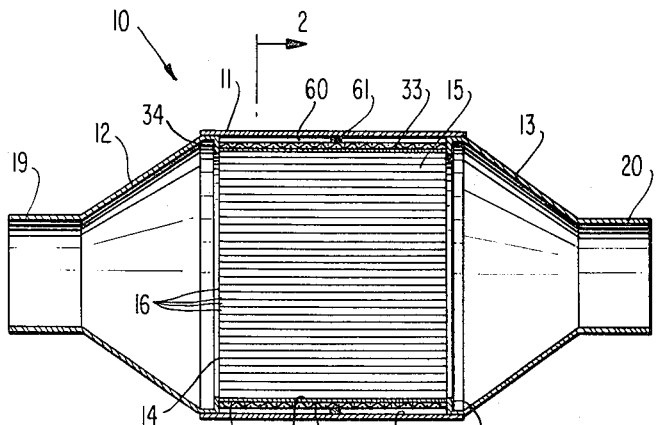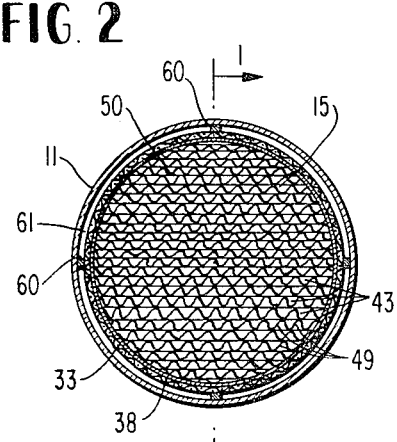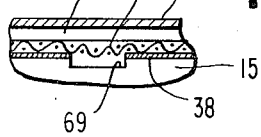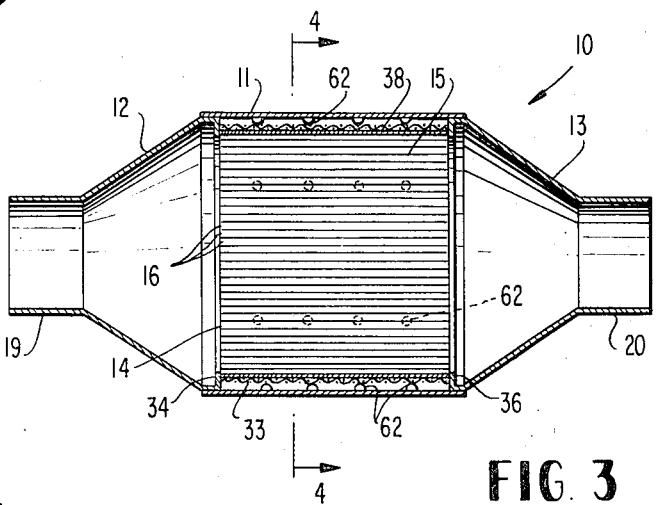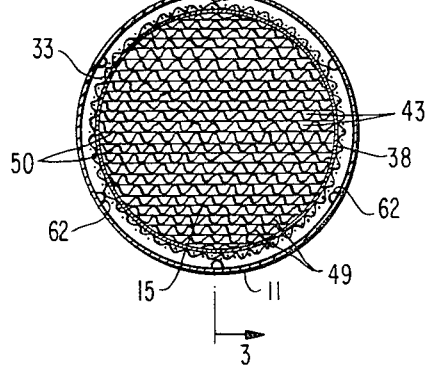
INVENTORS
CARL D. KEITH
JOHN J. MOONEY
LOUIS J. VANMANSART
ATTORNEYS United States Patent Office 3,692,497
Patented Sept. 19, 1972

ABSTRACT OF THE DISCLOSURE

A catalytic apparatus for purifying gases, e.g. the exhaust gas of an internal combustion engine, in which a unitary, catalytic element having gas flow paths therethrough, is secured within a surrounding casing by at least one end flange, preferably two end flanges, a resilient, flexible member surrounding said catalytic element, and at least one surface projecting inwardly from the interior wall of the casing and in contact with the resilient, flexible member. Rotation of the catalyst is prevented by one or a plurality of such surfaces, preferably at least three. When using a plurality of these surfaces it is preferred that at least two or at least three be spaced-apart from each other by at least about 90° with respect to the center of the casing. Longitudinal movement of the catalyst is prevented by the flanges and further movement of this type can also be counteracted by providing a recess in the exterior surface of the catalytic element or an inwardly projecting surface on the interior wall of the casing, and in contact with the resilient, flexible member.

This invention relates to a catalytic apparatus suitable for purifying gases, and the device finds particular utility in the treatment of exhaust gases from internal combustion engines in order to decrease pollution of the atmosphere.

Gases of various sorts are often discharged or exhausted into the air and frequently these gases serve to add undesirable materials or pollutants to the atmosphere. Although the problem has been under study for years and many different types of devices have been devised for combatting the difficulty, it is becoming increasingly important that such pollution be avoided.

A particular problem resides in the purification of exhaust gases emanating from internal combustion engines such as those employed in automotive vehicles. The exhaust products from the engines, which usually burn a hydrocarbon fuel such as hydrocarbon gases, gasoline or diesel fuel, can cause serious pollution of the atmosphere. Among the pollutants in these exhaust gases are hydrocarbons and oxygen-containing compounds, the latter including nitrogen oxides and carbon monoxide. The removal of these contaminants from the gases or the conversion of the pollutants to less objectionable materials is of significant importance to the well-being of our society.

U.S. Pat. No. 3,441,381 is directed to a catalytic apparatus which has been employed to purify various gases such as exhaust gases, and the device is particularly efficacious in the treatment of exhaust gases emanating from internal combustion engines which burn hydrocarbon or other fuels. Briefly, the device has a cylindrical casing section which houses a unitary catalyst having a plurality of gas flow channels or paths therethrough. A gas inlet and outlet are provided at their respective ends of the cylindrical casing. The outside diameter of the catalytic element which is also generally cylindrical, is somewhat smaller than the internal diameter of the cylindrical casing in order to permit insertion of the catalytic element into the casing after each of these members has been separately formed.

In order to hold the catalytic element tightly within the cylindrical casing a resilient, flexible member is positioned under compression between the casing and the catalyst. The catalytic element is often made of a refractory, ceramic material while the cylindrical casing is metallic, and the device of U.S. Pat. No. 3,441,381 maintains its integrity as each of its components expands at the elevated temperature at which the device is normally employed to purify a gas. In a very practical form of the apparatus the resilient, flexible member is a corrugated metallic structure which is foraminous such as a corrugated, knitted, metallic mesh fabric.

In the preferred device of U.S. Pat. No. 3,441,381, each end of the catalytic element is in contact with a flange which projects inwardly from the inner surface of the cylindrical casing. These flanges extend completely around the inner circumference of the casing and extend far enough towards the middle of the casing to bridge the space between the casing and the catalytic element and sufficiently across the respective faces of the latter to hold it against longitudinal movement within the cylindrical casing. Also, the flanges serve to keep the gas which is treated from by-passing the catalytic element, since the flanges block each end of the space between the catalytic element and the casing and thus the gases cannot avoid passing through the catalytic element as they travel from the inlet to the outlet of the device.

Although the apparatus of U.S. Pat. No. 3,441,381 has given excellent service in purifying the exhaust of commercial vehicles employing internal combustion engines, there are circumstances in which the catalytic element when essentially circular in cross-section, becomes displaced longitudinally within the surrounding casing and is even extruded through the opening in the holding flange positioned against the gas exit end of the catalytic element. It was determined that this undesirable result is due to the rotation of the circular cylindrical catalytic element within the cylindrical casing during the treatment of the exhaust gas even though the element is tightly held in the casing. As the catalytic element rotates, the exit face of the element is subjected to a grinding action or attrition where it contacts the holding flange. As grinding continues, the face of the catalytic element is removed in the area of flange contact and as a result the catalytic element has a tendency to move through the opening of the flange at the gas exit end of the cylindrical casing. As more of the catalyst element extrudes through the exit flange, less of the catalyst element is held securely by the resilient member. Movement therefore starts and then increases to the point where physical damage or total breakdown of the catalytic element can occur.

By the present invention we have found that the undesirable rotation and extrusion of the catalytic element of essentially circular cross-section as aforedescribed, can in essence be avoided by providing at least one inwardly protruding member or surface securely attached to the interior wall of the cylindrical casing and extending sufficiently into the interior of the casing to be in holding contact with resilient member around the catalyst element. This type of protruding member generally has in compressive contact with the resilient member, a surface disposed at a perpendicular or substantial oblique angle, e.g. of at least about 30°, to the circumference of the catalytic element at the location of the contact, to hold the catalytic element and resilient member against rotation within the casing. Preferably this angle is essentially perpendicular. The presence of a plurality of such inwardly protruding members is preferred and especially if at least one of these protruding surfaces is spaced around the internal wall of the cylindrical casing from another of such surfaces by at least about 90°, as seen from an end view and measured at the center of the cross-section. Preferably, there are provided at least three of such protruding surfaces having at least about 90° separation from each other, for instance, three of these members which are equally spaced around the catalyst element and thus about 120° apart. These protrusions can be exemplified, for instance, by an inwardly-projecting, rectangular cross-sectional bar mounted on the interior wall of the casing near the gas inlet and extending in a straight direction towards the gas exit.

The protruding surfaces extend inwardly from the internal wall of the cylindrical casing a significant distance, for instance, at least about 1/16 inch, to keep the catalytic element from rotating within the casing during use, but not so far as to prevent the insertion of the catalytic element into the casing and the positioning of the resilient, flexible member between the protruding surfaces and the catalytic element. Thus, the internal radius of the cylindrical casing, which in the present invention has an essentially circular cross-section, is slightly more than the total of the radius of the catalytic element, the perpendicular distance the protruding surfaces extend inwardly from the casing wall towards its center, and the thickness of the portion of the resilient member held between the catalytic member and the protruding surfaces.

As an additional feature of the present invention there can be provided in the periphery of the catalytic element one or more recess or notch structures which serve in cooperation with the compressed resilient member to inhibit, resist or oppose longitudinal movement of the catalytic element within the casing. The recess structure is spaced away from the gas inlet face of the catalytic element and thus the recess does not extend to this inlet face. Such recesses may extend completely or partially around the catalytic element and may be one or more notches spaced around the outer surface of the catalytic element. These recesses generally extend at least about 1/16, preferably at least about 1/8 inch, in depth inwardly from the periphery of the catalytic element, and preferably the recesses have front and rear walls that are approximately perpendicular to the casing. The width of the recesses in the longitudinal direction of the catalytic element is often at least about 1/8 inch, preferably at least about 1/4 inch.

In a still further embodiment of the apparatus of this invention there can be securely attached to the interior wall of the circular casing one or more inwardly-protruding surfaces positioned perpendicularly or at a substantial oblique angle, e.g. at least about 30°, to the longitudinal direction of the catalytic element at the location of contact with the resilient member. The longitudinal direction indicates the general or overall direction of gas flow through the catalytic element. This latter structure can be provided instead of, or in addition to, the notch structure in the periphery of the catalytic element, to contact and hold the resilient, flexible member under compression and inhibit, resist or oppose longitudinal movement of the catalytic element within the casing, and as an example may be a rectangular cross-sectional ring mounted on the inside of the catalyst casing. Such protruding surfaces extend inwardly from the internal wall of the casing a distance which makes them effective to keep the catalyst from moving longitudinally within the casing should there be any free space between the flanges and the ends of the catalytic element, but not so far as to prevent insertion of the catalytic element and resilient, flexible member into the casing as described above with respect to the inwardly protruding surfaces which prevent rotation of the catalyst element. Often the protrusions which inhibit longitudinal movement of the catalyst element extend inwardly from the inner surface of the casing, for instance, towards its center, a distance of at least about 1/32 inch, preferably at least about 1/16 inch.

The present invention will be further described with reference to the drawings in which:

FIG. 1 is a longitudinal sectional view of one embodiment of the device of this invention taken along lines 1—1 of FIG. 2.

FIG. 2 is a cross-sectional view taken along lines 2—2 of FIG. 1.

FIG. 2a is a cut-away view of a portion of FIG. 1 showing a different embodiment of the invention.

FIG. 3 is a longitudinal sectional view of another embodiment of the device of this invention taken along lines 3—3 of FIG. 4.

FIG. 4 is a cross-sectional view taken along lines 4—4 of FIG. 3.

Referring to the drawings, exhaust gas catalytic purifier 10 having frusto-conical end closure members 12 and 13 can be connected to a source of exhaust gases passing from an internal combustion engine, by conduit 19. The exhaust gases may be mixed with oxygen, e.g. air, prior to entering line 19.

The catalytic exhaust gas purifier 10 comprises a cylindrical metallic casing 11 typically being about 2–8 inches in circular diameter and 2 to 12 inches in length. The frusto-conical metallic end closure members 12 and 13 are secured at the gas inlet and outlet ends, respectively, of casing 11 as by welding or other means.

Frusto-conical member 12 is so dimensioned as to enable distribution or passage of the exhaust gases over the entire or substantially entire cross-sectional area of the upstream portion of casing 11, thereby to enter all or substantially all inlet openings 16 for the gas flow channels 43 in the unitary catalytic element 15 which is of circular cross-section. Such inlet openings 16 are positioned over the entire or substantially entire area of face 14 of the unitary, porous, ceramic-supported oxidation catalyst 15.

Frusto-conical member 13 is of similar dimensions as frusto-conical member 12 as shown, and of such dimensions as to enable free passage of gas out of the gas flow channel outlet openings of the supported catalyst 15 without causing substantial back pressures. Inlet conduit 19 is integral with frusto-conical members 12 as shown, and outlet conduit 20 is integral with frusto-conical member 13 as shown.

An annular space or gap 30 of substantially uniform width is defined between the inner surface 31 of cylindrical casing 11 and the outer surface 32 of the supported oxidation catalyst 15. Space 30 extends completely around the supported oxidation catalyst along the entire length of the catalyst structure. In the preferred form of the invention annular member or flange 34 is provided to bridge the gap of annular space 30 between the inner wall surface 31 and the upstream face marginal edge portion of the unitary support of oxidation catalyst 15 at the entrance to annular space 30, to provide a continuous barrier around the periphery of the supported catalyst against flow of unpurified exhaust gas into space 30 without blocking an unduly large or significant number of inlet openings 16. If desired, some of these openings may be blocked to insulate the resilient member and casing from the heat of the gases being treated. As shown, annular flange 34 is integral with the frusto-conical member 12 and can be a thin, narrow-width rim or flange of substantially uniform thickness and width formed by bending inwardly the inner terminal end portion of the frusto-conical member 12 a sufficient extent to form the inwardly-extending annular member or flange, the plane of which extends normal to the principal axis of casing 11. Annular space 30 has a typical width of 1/8", and annular flange 34 has a typical width of 1/4".

Annular member or flange 36 bridges the annular space 30 at the gas outlet end face of the unitary oxidation catalyst 15 and between the inner wall surface 31 and the downstream face marginal edge portion of the catalyst unitary support to provide a continuous barrier around the periphery of the supported catalyst without blocking the exit openings of an unduly large or significant number of flow channels in the catalytic element as in the case of flange 34. Thus whether or not flange 34 is present, flange 36 will block gas flow through annular space 30. Annular flange 36 may be integral with frusto-conical member 13 and can be a thin, narrow-width flange of substantially uniform thickness and width formed by bending inwardly the inner terminal end portion of the frusto-conical member 13 similarly as in forming annular flange 34. Annular flange 36 is of similar width as annular flange 34, and the plane of flange 36 is generally perpendicular to the principal axis of frusto-conical member 13. Annular rims or flanges 34 and 36 function to secure or maintain the supported oxidation catalyst 15 against longitudinal movement within casing 11, and the use of flange 36 is especially advantageous since the direction of gas flow tends to move the catalytic elements towards the gas exit end of the device. Layer 38 of, for instance, Fiberfax cement, a fibrous aluminum silicate, is preferably provided on the outer surface of the catalyst 15 to seal the pores at the outer surface of the catalyst and also to serve as a protective coating or padding for the oxidation catalyst.

Member 33, which has an uneven or ridged surface on both sides and is preferably corrugated, snugly encompasses unitary refractory element-supported oxidation catalyst 15 in contact therewith and the inner surface of casing 11, for absorbing mechanical shock and compensating for differences in thermal expansion of the metallic casing wall and the refractory ceramic support of catalyst 15. Preferably member 33 is a corrugated, knitted mesh metallic fabric, due to the considerably greater flexibility and resiliency of the knitted mesh fabric than that, say, of a corrugated metal sheet. The knitted mesh fabric provides more points of contact with the supported oxidation catalyst 15, and accordingly there is improved shock absorption and expansion compensation with the knitted fabric.

In the embodiment of the present invention shown in FIGS. 1 and 2, there are provided four ribs 60 extending from the inner surface of the casing 11 towards the catalytic element 15. The ribs are fixed to the casing and run longitudinally and parallel along the casing wall. The ends of ribs 60 terminate just short of their respective flange 34 or 36. Ribs 60 are generally made of metal and are essentially inflexible under the force to which they are subjected during use of the device. The ribs may be welded on the casing wall or the ribs may be provided in other ways, e.g. by forming indentations in the casing so that its exterior surface is fluted. Ribs 60 project inwardly of casing 11 a distance which permits the insertion into the casing of the unitary catalytic element 15 and member 33, but the ribs contact member 33 at least at several points along each rib. The points of contact may be with raised portions of member 33. As an example, space 30 may have a width of ⅛ inch, the corrugated member 33 metal thickness of 1/16 inch with the corrugations giving an overall thickness of ¼ inch when uncompressed, and ribs 60 extend inwardly of the inner surface of casing 1/16 inch.

By providing ribs 60, rotational movement of unitary catalyst 15 is minimized and the catalyst remains in a stationary position during operation of the device and the movement of any vehicle on which it is mounted. Since rotation of catalyst 15 is minimal, there is little, if any, attrition of its faces by the flanges and extrusion of the catalyst through the opening formed by flange 36 is avoided.

As a further improvement in the device of FIGS. 1 and 2, there can be provided annular ring 61 which goes completely around the inner wall of casing 11, thereby interrupting ribs 60 about their mid-lengths as shown in FIG. 1. Alternatively, ribs 60 may interrupt ring 61, but in any event ring 61 is constructed similarly to ribs 60 to contact corrugated member 33 and hold the catalytic element against longitudinal movement within casing 11 during use of the device. In place of ring 61, or in addition thereto, notch 69 may be provided completely around the periphery of the catalyst element and perpendicular to its longitudinal direction as shown in FIG. 2a. The notch may be, for instance, 1/16 inch deep and ¼ inch wide. As a result of the tightness of the fit and compressive force exerted against resilient member 33, the latter is forced into holding contact with notch 69.

In the embodiment of the invention shown in FIGS. 3 and 4 of the drawings, projections 62 extend inwardly of casing 11 and serve to contact the corrugated member 33 and hold it under further compression at a plurality of points around and along the length of catalyst element 15. Projections 62 can be formed by dimpling casing 11, but in any event they extend sufficiently into the casing to cooperate with corrugated member 33 and hold the unitary catalyst element against rotational and longitudinal movement during use. Thus, projections 62 can extend inwardly the same distance as mentioned above with respect to ribs 60 and ring 61. Projections 62 could be characterized as being mound-like in shape.

The purification apparatus of this invention, exclusive of the unitary, refractory skeletal supported oxidation catalyst, has been fabricated of ferrous metal, but can be made of other metals capable of withstanding the high temperatures to which the apparatus is subjected, for instance up to 800° C. and even higher. The supported oxidation catalyst 15 can comprise a unitary, solid refractory skeletal structure of, for instance, cordierite as the support. The skeletal structure can have pores in its interior portion and also superficial pores communicating with gas flow channels 43 which extend through the skeletal structure. Channels 43, as shown, are of generally trapezoidal shape in cross-section and are defined by the corrugations 49 and generally horizontal layers 50 of the skeletal structure. An activated refractory metal oxide, for instance, a gamma family or activated-type alumina, can be formed on the surface of gas flow channels 43 and also on the surfaces of the superficial pores which communicate with channels 43. The oxidation catalytic metal component can be carried by the active refractory metal oxide. The catalytic metal component can contain, for instance, a platinum group metal, base metal, or combinations thereof deposited on the active refractory metal oxide. Some of the catalytic metal may also be deposited directly on the skeletal structure surfaces.

The unitary, skeletal structure support of the oxidation catalyst of this invention is characterized by having a large plurality of flow channels or paths extending therethrough in the general direction of gas flow. The supported catalyst is disposed in the purifier in such fashion that its unitary skeletal structure occupies the major part of the cross-sectional area of the reaction zone, with there being the narrow space 30 between it and the purifier wall. Advantageously, the unitary skeletal structure is shaped to fit the reaction zone of the purifier casing into which it is to be disposed, and the unitary supported catalyst is placed therein lengthwise as to its cellular gas flow channels, i.e., with the channels extending in the general direction of gas flow between the purifier inlet and outlet so that the gases flow through the channels during their passage through the converter. The flow channels need not pass straight through the catalyst structure and may contain flow diverters or spoilers.

The skeletal structure support is preferably constructed of a substantially chemically and relatively catalytically inert, rigid, solid material capable of maintaining its shape and strength at high temperatures, for instance up to about 1100° C. or more. The support may have a low thermal coefficient of expansion, good thermal shock resistance, and low thermal conductivity. Often the skeletal support is porous but its surface may be relatively non-porous, and it may be desirable to roughen its surface so that it holds the catalyst coating better, especially if the support is relatively non-porous. The suport may be metallic or ceramic in nature or a combination thereof.

Although the support may be a glass ceramic, it is preferably unglazed and may be essentially entirely crystalline in form and marked by the absence of any significant amount of glassy or amorphous matrices, for instance of the type found in porcelain materials. Further, the skeletal structure may have considerable accessible porosity as distinguished from the substantially non-porous porcelain utilized for electrical applications, for instance in spark plug manufacture, characterized by having relatively little accessible porosity. The walls of the channels of the unitary skeletal support structures can contain a multiplicity of surface macropores in communications with the channels to provide a considerable increased accessible catalyst surface, and a substantial absence of small pores for high temperature stability and strength. Whereas the superficial surface area of such structures may be of the order of 0.001 to 0.01 m.$^2$/g., including the channels, the total surface area is preferably many times greater, so that much of the catalytic reaction may take place in the large pores.

The geometric superficial or apparent surface area of the carrier including the walls of the gas flow channels will often be about 0.5 to 6, preferably 1 to 2.5, square meters per liter of support. The channels through the unitary body or skeletal structure can be of any shape and size consistent with the desired superficial surface and should be large enough to permit free passage of the gas mixture of exhaust gas and oxygen-containing gas. The channels may be parallel or generally parallel and extend through the support from one side to an opposite side, such channels being separated from one another by preferably thin walls. The channels may also be multidirectional and may even communicate with one or more adjacent channels. The channel inlet openings can be distributed across essentially the entire face or cross-section of the support subject to initial contact with the gas to be reacted. The preferred skeletal structure supports are comprised of one or more of cordierite, cordierite-alpha alumina, zircon - mullite, spodumene, alumina - silica-magnesia and materials utilizable in place of the preferred materials as support or carrier are sillimanite, magnesium silicates, zircon, petalite, alpha-alumina and aluminosilicates.

The gas flow channels of the unitary ceramic skeletal supported catalyst may be thin-walled channels providing a relatively large amount of superficial surface area. The channels can be one or more of a variety of cross-sectional shapes and sizes. The channels can be of the cross-sectional shape, for example, of a trapezoid, rectangle, square, sinusoid, or circle so that cross-sections of the support represent a repeating pattern that can be described as a honeycomb, corrugated or lattice structure. The walls of the cellular channels are generally of a thickness necessary to provide a strong unitary body, and the thickness will often fall in the range of about 2 to 10 mils. With this wall thickness the structures may contain from about 100–2500 or more gas inlet openings for the flow channels per square inch and a corresponding number of the gas flow channels, preferably about 150 to 500 gas inlet and flow channels per square inch. The open area of the cros-section may be in excess of 60% of the total area. The size and dimensions of the unitary refractory skeletal support of this invention can be varied.

The refractory metal oxide in the preferred embodiment of the catalyst is deposited on the unitary skeletal support as continuous or discontinuous thin deposits preferably of thickness of about 0.0004" to 0.001". Such catalytically-active oxide may be a calcined refractory metal oxide which itself is characterized by a porous structure and which possesses a relatively large internal pore volume and total surface area. Generally, the total surface area of the active refractory metal oxide is at least about 25 square meters/gram, preferably at least about 100 square meters/gram. Such oxides can be prepared by dehydrating the hydrate form of the oxide by calcination usually at temperatures of about 150° C. to 800° C. The preferred active metal oxides contain members of the gamma or activated alumina family which can be prepared, for instance, by precipitating hydrous alumina gel and thereafter drying and calcining to expel hydrated water and provide the active alumina. A particularly preferred active refractory metal oxide is obtained by drying and calcining at temperatures of about 300° C. to 800° C., a mixture of precursor hydrous alumina phases predominating in crystalline trihydrate, that is, containing in excess of about 50% of the total alumina hydrate composition, preferably at least about 65%, of one or more of the trihydrate forms gibbsite, bayerite and nordstrandite as determined by X-ray diffraction. The substantial balance of the hydrate, may be amorphous hydrous or boehmite alumina or their mixtures. Other suitable active oxides include, for example, active or calcined beryllia, zirconia, magnesia, silica, spinels, etc., and combinations of oxides such as boria-alumina, thoria-alumina, titania-alumina, zirconia-alumina, silica-alumina, etc. Preferably, the activated refractory oxide is composed predominantly of oxides of one or more metals of Groups II, III and IV having atomic numbers not exceeding 40. The active refractory oxide deposit may constitute, for example, about 10 to 150 grams per liter of the unitary suport, preferably about 30 to 120 grams per liter.

The preferred oxidation catalysts herein contain platinum group meals, e.g., platinum, rhodium, palladium or iridium, base metals or combinations thereof. The oxidation catalysts also utilizable herein include, for example, one or more of Cr, Mn, V, Cu, Fe, Co, Ni or other metals or their compounds. The catalytic metal can be combinations of these metals or their oxides or other combined forms. The metal is present in a catalytically-effective amount, and is often a minor weight percent of the total catalytic element 15, but especially with the base metals larger amounts may be used.

In operation, the exhaust gases from an internal combustion engine, for instance that of a spark-ignition, reciprocating, internal combustion engine of an automobile or fork-lift truck and containing combustible, air-polluting constitutents, for instance hydrocarbons, oxygenated hydrocarbons and carbon monoxide, pass at high velocity from the engine exhaust system in admixture with an amount of oxygen required for the combustion of the combustible constituents, and preferably in excess of the stoiichiometric amount required for such combustion. The oxygen may be present in the exhaust gases as the result of the engine burning a lean fuel mixture, or oxygen, for instance, as air, may be added to the exhaust gases. The exhaust gases containing oxygen pass at elevated temperature within inlet conduit 19 of catalytic purifier 10, and into and through the multiplicity of flow channels 43 extending through supported oxidation catalyst 15. The gaseous admixture contacts the active catalyst component within the superfiicial macropores of porous supported catalyst 15 and also on the surface of the flow channels 43 at a temperature of the supported catalyst of typically about 150° C.–700° C., whereby the combustible air-polluting constituents are oxidized to more innocuous gases such as $CO_2$ and $H_2O$. The thus-purified gases are then passed from purifier 10 through discharge conduit 20 either directly into the atmosphere or into a tail pipe or conduit for ultimate discharge to the atmosphere. During this operation, the catalyst element is held stationary within casing 11.

We claim:

1. An apparatus suitable for purifying gases comprising an essentially circular cylindrical casing and defining an enclosed space;

a gas inlet and a gas outlet communicating with said casing;

an essentially circular cylindrical, unitary, oxidation catalyst of lesser diameter than the casing enclosed space and positioned between the gas inlet and outlet, the catalyst having a unitary, solid skeletal structure having a plurality of gas inlets and a plurality of gas outlets, and gas flow paths through the skeletal structure from the gas inlets to the gas outlets, and an oxidation catalyst on surfaces of the paths;

a narrow, annular space defined between the unitary oxidation catalyst and the casing wall inner surface;

a gas barirer member at a downstream portion of the casing and bridging said space between the casing wall inner surface and the supported catalyst downstream face marginal edge portion but permitting gas to exit from said unitary catalyst;

resilient means compressively encompassing the unitary oxidation catalyst between the catalyst and casing wall inner surface;

an inwardly protruding member on the interior wall of said casing and having a surface in compressive contact with said resilient means to hold the resilient means and catalyst against rotation within said casing.

2. The apparatus of claim 1 in which there is also provided an inwardly-protruding member on the interior of said casing wall in contact with said resilient means to hold the catalyst against longitudinal movement within said casing.

3. The apparatus of claim 1 wherein there is provided a recess in the periphery of said catalyst to hold the catalyst against longitudinal movement within said casing.

4. The apparatus of claim 1 wherein there are a plurality of said inwardly protruding members on the interior wall of said casing and at least two of said plurality of members are spaced around the interior wall of said casing by at least about 90° with respect to each other.

5. The apparatus of claim 4 in which said plurality of inwardly-projecting members are at least three in number which are at least about 90° separated from each other.

6. The apparatus of claim 5 in which the compressive contact surfaces of the plurality of inwardly-projecting members are longitudinally extended, and essentially parallel to each other and to the longitudinal axis of said casing.

7. The apparatus of claim 5 in which there is also provided an inwardly-protruding member on the interior of said casing wall in contact with said resilient means and serving to hold the catalyst against longitudinal movement within said casing.

8. The apparatus of claim 7 in which all of the inwardly projecting members are mounds on the interior surface of said casing.

9. The apparatus of claim 5 wherein there is provided an inwardly-extending, gas barrier member secured at an upstream portion of the casing, the barrier member bridging said space between the casing wall inner surface and the supported catalyst upstream face marginal edge portion but permitting gas to enter said unitary catalyst.

10. The apparatus of caim 9 wherein the resilient means is flexible, knitted mesh corrugated metal fabric.

11. The apparatus of claim 10 wherein activated alumina is deposited on surfaces of the catalyst support communicating with the gas flow channels and a platinum group metal as oxidation catalyst is carried by the activated alumina.

References Cited
UNITED STATES PATENTS

| | | | |
|---|---|---|---|
| 3,016,108 | 1/1962 | Myddelton. | |
| 3,441,381 | 4/1969 | Keith et al. | 23—288 F |
| 3,441,382 | 4/1969 | Keith et al. | 23—288 F |
| 3,597,165 | 8/1971 | Keith et al. | 23—288 F |

BARRY S. RICHMAN, Examiner

U.S. Cl. X.R.

23—2 E, 288 R; 55—278, DIG. 30; 60—299